United States Patent
Shellhammer (10) Patent No.: US 8,031,807 B2
(45) Date of Patent: Oct. 4, 2011

(54) SYSTEMS AND METHODS FOR DETECTING THE PRESENCE OF A TRANSMISSION SIGNAL IN A WIRELESS CHANNEL

(75) Inventor: Stephen J. Shellhammer, Ramona, CA (US)

(73) Assignee: QUALCOMM, Incorporated, San Diego, CA (US)

(\*) Notice: Subject to any disclaimer, the term of this patent is extended or adjusted under 35 U.S.C. 154(b) by 648 days.

(21) Appl. No.: 11/935,911

(22) Filed: Nov. 6, 2007

(65) Prior Publication Data

US 2008/0112467 A1 May 15, 2008

Related U.S. Application Data

(60) Provisional application No. 60/865,348, filed on Nov. 10, 2006.

(51) Int. Cl.
*H04L 27/00* (2006.01)
(52) U.S. Cl. ........................................ 375/316
(58) Field of Classification Search .......... 375/142, 375/143, 144, 148, 150, 152, 316, 343, 346; 455/63.1, 114.2, 278.1, 296
See application file for complete search history.

(56) References Cited

U.S. PATENT DOCUMENTS

| | | | |
|---|---|---|---|
| 5,272,446 A * | 12/1993 | Chalmers et al. | 329/304 |
| 6,879,627 B1 * | 4/2005 | Davidson et al. | 375/222 |
| 7,218,359 B2 | 5/2007 | Peng et al. | |
| 2004/0023918 A1 | 2/2004 | Monia et al. | |
| 2005/0286402 A1 | 12/2005 | Byun et al. | |
| 2006/0067354 A1 | 3/2006 | Waltho et al. | |

FOREIGN PATENT DOCUMENTS

| | | |
|---|---|---|
| RU | 2252429 | 5/2005 |
| TW | 200605525 | 2/2006 |
| WO | WO9848294 | 10/1998 |
| WO | WO2006009713 | 1/2006 |

OTHER PUBLICATIONS

Pearlstein, U.S. Appl. No. 60/808,554, filed May 26, 2006, p. 1-24.*
Cabric D et al: "Implementation Issues in Spectrum Sensing for Cognitive Radios" Signals, Systems and Computers, 2004 Conference Record of the Thirty-Eighth Asilomar Conference on Pacific Grove, CA, XP-010781056 ,IEEE Nov. 7, 2004, pp. 772-776.
International Search Report and Written Opinion—PCT/US2007/084369, International Search Authority—European Patent Office—May 2, 2008. Kay, S.M.; Marple, S.L., Jr.; "Spectrum Analysis—A Modern Perspective,". Proceedings of the IEEE, vol. 69 , Issue: 11, Digital Object Identifier: 10.1109/PROC.1981.12184, Publication Year: 1981 , pp. 1380-1419.
Welch, P.; "The Use of Fast Fourier Transform for the Estimation of Power Spectra: A Method Based on Time Aver. Aging Over Short, Modified Periodograms," Audio and Electroacoustics, IEEE Transactions on; vol. 15, Issue: 2; Digital Object Identifier: 0.1109/TAU.1967.1161901; Publication Year: 1967 , pp. 70-73.
Taiwan Search Report—TW096142763—TIPO—Apr. 4, 2011.

\* cited by examiner

*Primary Examiner* — Sam K Ahn
(74) *Attorney, Agent, or Firm* — William M. Hooks (57) ABSTRACT

A method for detecting the presence of a transmission signal in a wireless spectrum channel. The frequency of a signal is converted from a first frequency to a second frequency. The signal with the second frequency is filtered to remove signals that are not within the band of the second frequency. An averaged periodogram of the signal is calculated. A value of the averaged periodogram is compared to a threshold. The presence of the transmission signal is detected, if the value of the averaged periodogram exceeds the threshold.

22 Claims, 9 Drawing Sheets

SYSTEMS AND METHODS FOR DETECTING THE PRESENCE OF A TRANSMISSION SIGNAL IN A WIRELESS CHANNEL

RELATED APPLICATIONS

This application is related to and claims priority from U.S. Provisional Patent Application Ser. No. 60/865,348 filed Nov. 10, 2006, for METHOD AND APPARATUS FOR SPECTRUM SENSING FOR WIRELESS COMMUNICATION, with inventor Stephen J. Shellhammer, which is incorporated herein by reference.

TECHNICAL FIELD

The present disclosure relates generally to communications and wireless communications-related technologies. More specifically, the present disclosure relates to systems and methods for detecting the presence of a transmission signal in a wireless channel.

BACKGROUND

Wireless communication networks are widely deployed to provide various types of services such as voice, packet data, broadcast, and so on. For example, these wireless networks include Code Division Multiple Access 2000 (CDMA2000) networks, Global System for Mobile Communications (GSM) networks, Wideband Code Division Multiple Access (W-CDMA) networks and Worldwide Interoperability for Microwave Access (WiMAX) networks.

Each wireless network utilizes a particular air interface to support over-the-air communication and typically further implements a particular mobile networking protocol that supports roaming and advanced services. For example, a W-CDMA network utilizes a code division multiple access (CDMA) air interface and GSM EDGE Radio Access Network (GERAN) networking protocol.

The telecommunication standards cited above are examples of some of the various communications systems that may be implemented to transmit voice and/or data. Within these systems, multiple channels may be available to be utilized by multiple types of transmissions. Devices within these systems may scan a frequency spectrum of these channels with the goal of identifying unused spectrum, however, certain types of transmissions using a frequency spectrum may not be detected. As such, benefits may be realized by improved systems and methods for detecting the presence of a transmission signal in a wireless channel.

DETAILED DESCRIPTION

A method for detecting the presence of a transmission signal in a wireless spectrum channel. The frequency of a signal is converted from a first frequency to a second frequency. The signal with the second frequency is filtered to remove signals that are not within the band of the second frequency. An averaged periodogram of the signal is calculated. A value of the averaged periodogram is compared to a threshold. The presence of the transmission signal is detected, if the value of the averaged periodogram exceeds the threshold.

A wireless device for detecting the presence of a transmission signal in a wireless spectrum channel is also described. The wireless device includes a processor and memory in electronic communication with the processor. Instructions are stored in the memory. The frequency of a signal is converted from a first frequency to a second frequency. The signal with the second frequency is filtered to remove signals that are not within the band of the second frequency. An averaged periodogram of the signal is calculated. A value of the averaged periodogram is compared to a threshold. The presence of the transmission signal is detected, if the value of the averaged periodogram exceeds the threshold.

An apparatus that is configured to detect the presence of a transmission signal in a wireless spectrum channel is also described. The apparatus includes means for converting the frequency of a signal from a first frequency to a second frequency and means for filtering the signal with the second frequency to remove signals that are not within the band of the second frequency. The apparatus also includes means for calculating an averaged periodogram of the signal. The apparatus further includes means for comparing a value of the averaged periodogram to a threshold and means for detecting the presence of the transmission signal, if the value of the averaged periodogram exceeds the threshold.

A computer-program product for detecting the presence of a transmission signal in a wireless spectrum channel is also described. The computer-program product includes a computer readable medium having instructions thereon. The instructions include code for converting the frequency of a signal from a first frequency to a second frequency and code for filtering the signal with the second frequency to remove signals that are not within the band of the second frequency. The instructions also include code for calculating an averaged periodogram of the signal. The instructions further include code for comparing a value of the averaged periodogram to a threshold and code for detecting the presence of the transmission signal, if the value of the averaged periodogram exceeds the threshold.

A cognitive radio scans a radio frequency (RF) spectrum with the goal of identifying unused frequency bands in the RF spectrum. The unused frequency bands may be used for unlicensed wireless operation. The process of scanning the RF spectrum to identify unused frequency bands may be referred to as "spectrum sensing" below. In some examples, unused television (TV) channels in a certain geographic region are utilized for unlicensed cognitive radio operations. These unused TV channels are often referred to as "whitespace" below.

The Institute of Electrical and Electronic Engineers (IEEE) has formed a working group (i.e., IEEE 802.22) to develop a standard for wireless regional area networks (WRAN) operating in these geographically unused TV channels. The IEEE standard includes cognitive radio techniques for identification of these unused TV channels. There are several possible licensed transmissions that may occupy a TV channel. Some examples of these transmissions include analog TV, Advanced Television Systems Committee (ATSC) digital TV, professional wireless microphones, etc. In one example, a TV channel is deemed to be occupied if a licensed transmission is above a certain power threshold, otherwise, the TV channel is deemed to be unoccupied and hence available for unlicensed wireless use. The present systems and methods describe a method of identifying TV channels that are not occupied by an ATSC television transmission.

A cognitive radio has the capability to scan a spectrum and sense the presence of a signal from a licensed transmission. The cognitive radio senses the presence of the signal at a low signal to noise ratio (SNR). The reason for this is that the cognitive radio may be in a faded location and should still be able to detect the licensed transmission. The IEEE 802.22 WRAN includes a sensing condition that causes a signal from an ATSC transmission (hereafter, "ATSC signal") to be detected at −116 dBm which corresponds to approximately −21 decibels (dB) SNR. Therefore, the ATSC signal is 21 dB weaker than the noise level.

The ATSC signal includes several features which a cognitive radio may use to detect weak ATSC signals. One of these features includes a sinusoidal pilot signal. This pilot signal is 11.3 dB weaker than the data portion of the ATSC signal. Previous systems and methods have suggested filtering the frequency of the pilot signal with a 10 kilohertz (KHz) filter and then using the power of the resulting signal to detect the presence of an ATSC signal, however, such an approach does not meet the sensing condition of the IEEE 802.22 provided above. The present systems and methods describe a method to determine which TV channels are occupied by a licensed transmission, such as an ATSC transmission, where the SNR is even lower than the −21 dB SNR as conditioned by the IEEE 802.22 working group.

Figure 1:
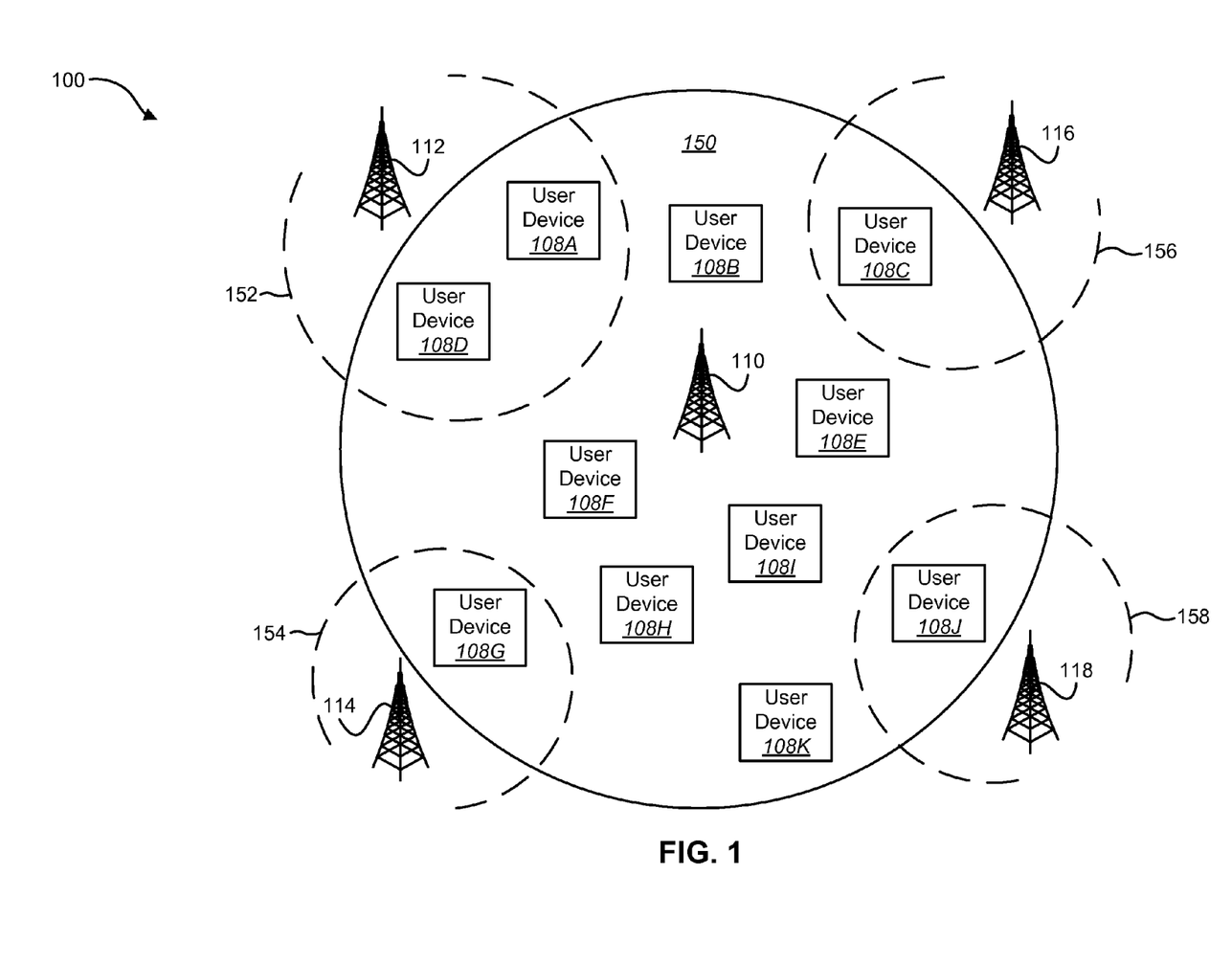
FIG. 1 illustrates a network configuration according to one example of the present systems and methods.

FIG. 1 illustrates a network configuration 100 according to one example of the present systems and methods. The configuration 100 includes a plurality of base stations 110, 112, 114, 116, 118 and a plurality of user devices 108A-108K. The user devices 108A-108K may be cognitive radio devices, wireless devices, mobile stations, etc. The configuration 100 also includes a plurality of service areas 150, 152, 154, 156, 158. A first service area 150 includes a first base station 110 and the plurality of user devices 108A-108K. The first service area 150 may be overlapped with a second service area 152, a third service area 154, a fourth service area 156 and a fifth service area 158. As shown, some user devices may be located in a service area that is overlapped by a different service area.

The plurality of base stations 110, 112, 114, 116, 118 may provide service to the user devices located in their respective service area. For example, a first base station 110 may provide services to and perform communications with the user devices located in the first service area 150. Each of the plurality of user devices 108A-108K may scan the band of frequencies utilized by one or more base stations 110, 112, 114, 116, 118 as well as the frequencies used by other user devices. A user device that is located in an overlap area between two service areas may scan the frequency band utilized by each base station providing service in the overlap area. Each of the user devices may also sense whether a channel is occupied by a licensed transmission. For example, each user device may sense whether a TV channel is currently occupied by a licensed ATSC transmission. Unoccupied channels may be used for unlicensed wireless operations by the user devices 108A-108K.

In one example, the ATSC signal occupies a 6 megahertz (MHz) TV channel. TV channels may range from 54 MHz in the low very high frequency (VHF) band to 698 MHz in the ultra high frequency (UHF) band. A sinusoidal pilot signal may be inserted into the ATSC baseband signal prior to conversion of the signal to a radio frequency (RF) signal and transmission of the signal. The frequency of the pilot signal may be specified relative to the lower band edge of the TV channel being used. There may be multiple different pilot frequencies that may be used. In one example, the exact pilot frequency is determined by external conditions. For example, the exact pilot frequency may be determined based upon the other TV signals that are present in the same geographical area. Two possible pilot frequencies may be the following:

TABLE 1

| ATSC Pilot Frequencies |
| --- |
| 309440.559 ± Hz |
| 328843.6 ± Hz |

Figure 2:
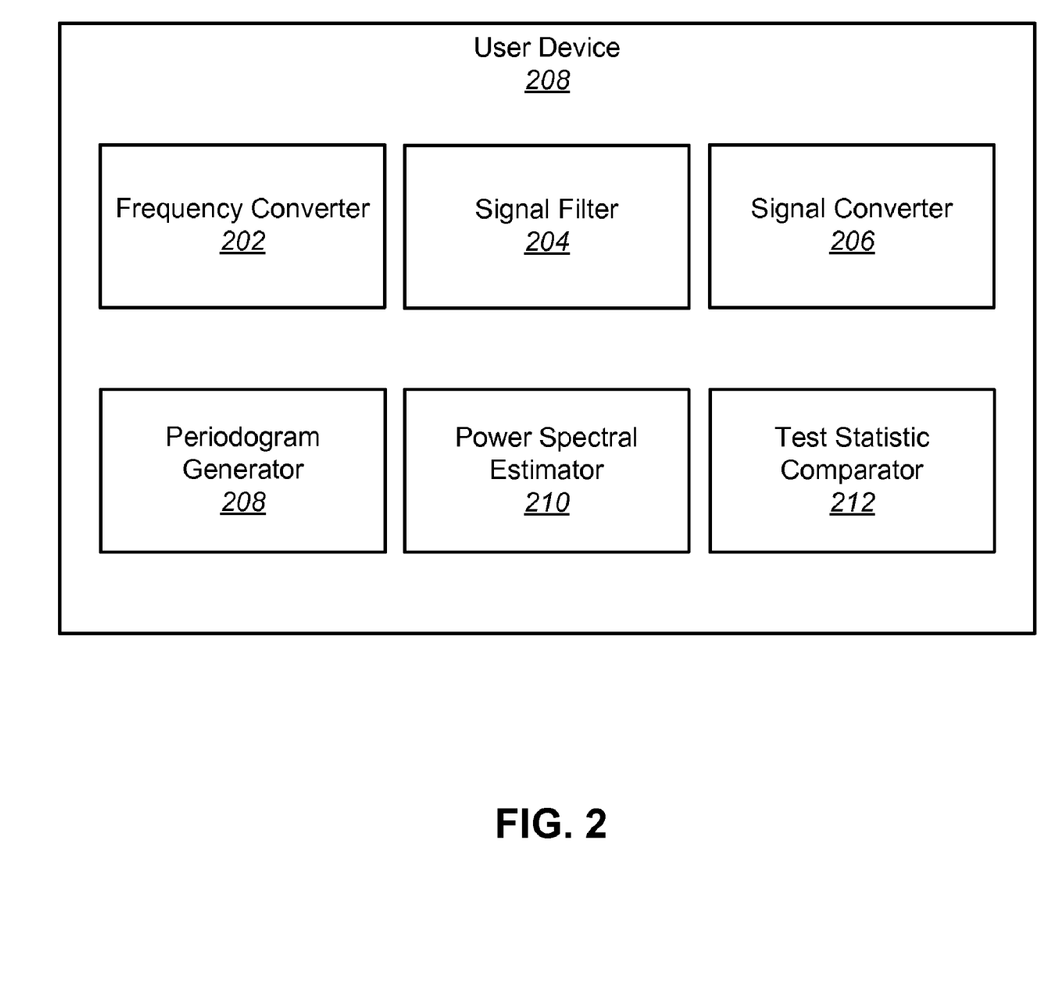
FIG. 2 is a block diagram illustrating a further example of a user device.

FIG. 2 is a block diagram illustrating a further example of a user device 208. The user device 208 may be a cognitive radio, wireless station, user equipment (UE), etc. A frequency converter 202 may convert a received RF signal to an intermediate frequency (IF) signal by mixing the received RF signal with a sinusoidal local oscillator. The pilot frequency of the received signal after conversion to IF, relative to the lower band edge of the 6 MHz IF band, is the same value used in transmission, however, any error in a receiver local oscillator (LO) frequency may result in an unknown shift in the pilot frequency. If the LO is accurate to within ±6 parts per million (ppm) and the LO frequency is $f_0$, then the LO frequency error may be given by the following:

$$LO_{error} = (\pm \delta)(f_0) Hz \quad \text{Equation 1}$$

The LO frequency $f_0$ may be the difference between the RF frequency and the IF frequency. For an ATSC signal, the LO frequency $f_0$ may be less than 700 MHz. Thus, the worst case LO frequency error may be the following:

$$LO_{error} = (\pm 700\delta) Hz \quad \text{Equation 2}$$

As a result of the LO frequency error, the pilot frequency, $f_p$, at IF (and subsequently at base band) ranges between the following:

$$309440.559 - (700\delta + 10) < f_p < 328843.6 + (700\delta + 10) \quad \text{Equation 3}$$

For a highly accurate LO with an accuracy of 2 ppm (δ=2), the pilot frequency, $f_p$, ranges between the following:

$$308030.559 < f_p < 330253.6 \quad \text{Equation 4}$$

Hence, there is a pilot frequency uncertainty at IF of approximately:

$$\Delta f = 22.223 \text{ KHz} \quad \text{Equation 5}$$

The frequency of the pilot signal inserted into an ATSC signal should be a frequency that includes a bandwidth that is larger than the pilot frequency uncertainty provided by Equation 5.

A signal filter 204 may be used to filter out any out-of-band signals from the converted frequency signal. In one example, a signal converter 206 converts the IF signal into a complex signal. The resulting complex signal may be filtered by the signal filter 204 in order to capture the ATSC pilot signal. A periodogram generator 208 may be utilized to generate averaged periodograms. A power spectral estimator 210 may estimate the power spectrum of the complex signal using the averaged periodograms. A test statistic comparator 212 may compare a value of the averaged periodogram to a predefined threshold. If the value of the averaged periodogram exceeds the threshold, it may be determined that an ATSC signal is present in a specific TV channel. In other words, it may be determined that the specific TV channel is already occupied by a licensed transmission.

Figure 3:
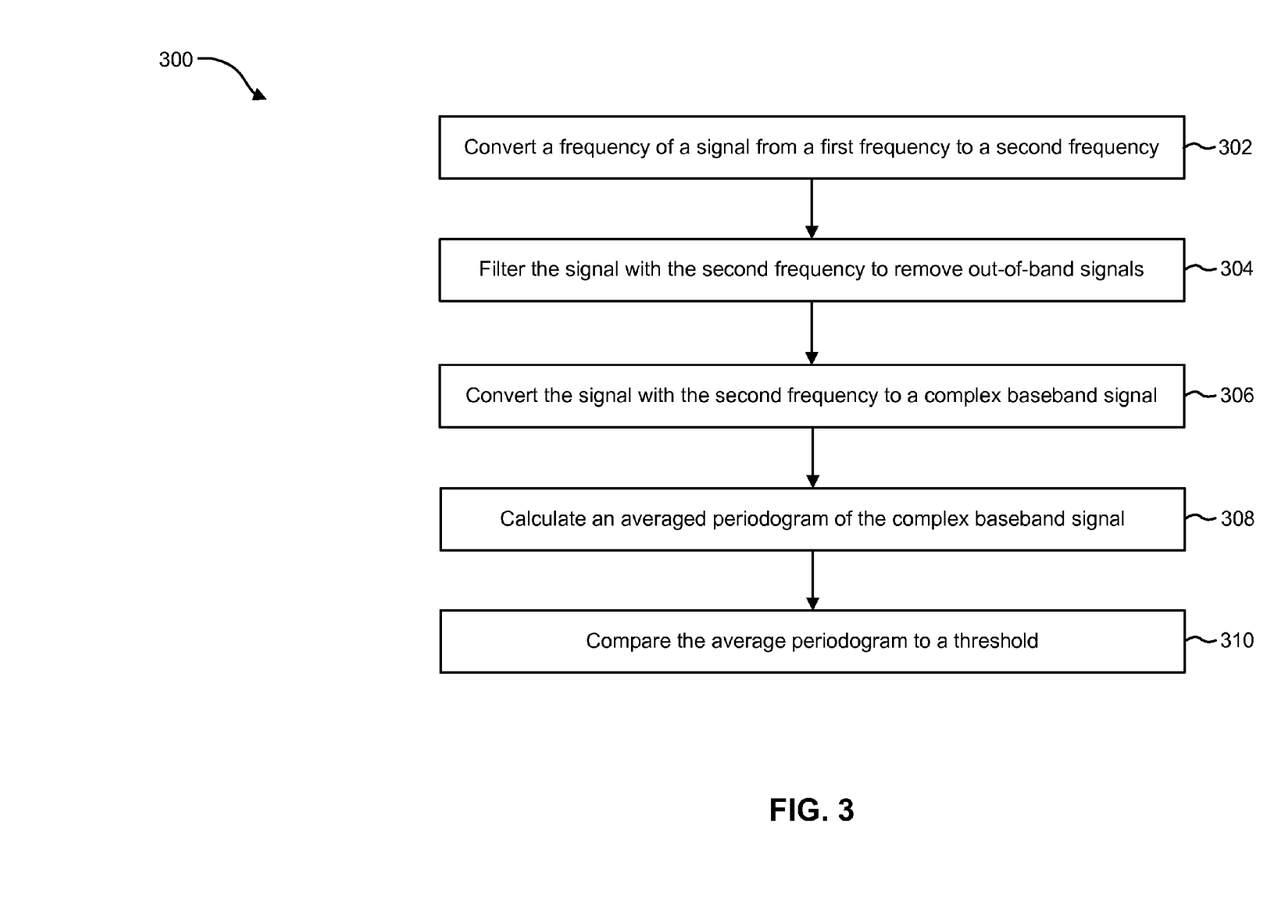
FIG. 3 is a flow diagram illustrating one example of a method for determining if a channel is occupied by a licensed transmission.

FIG. 3 is a flow diagram illustrating one example of a method 300 for determining if a channel is occupied by a licensed transmission. In one example, the channel is a TV channel and the licensed transmission is an ATSC transmission. A frequency of a signal may be converted 302 from a first frequency to a second frequency. For example, an RF signal may be converted to an IF signal. The signal may be converted 302 using a local oscillator (LO) and an RF mixer. The signal with the second frequency may be filtered 304. In one example, the IF signal is filtered 304 to remove out-of-band signals. The signal with the second frequency may be converted 306 to a complex baseband signal. The complex baseband signal may also be filtered. In one example, an averaged periodogram of the complex baseband signal is calculated 308. In addition, an estimate of a power spectrum of the complex baseband signal is also calculated based on the averaged periodogram. The averaged periodogram may be compared 310 to a threshold. The results of the comparison 310 determine whether the channel is occupied or unoccupied by a licensed transmission.

Figure 3A:
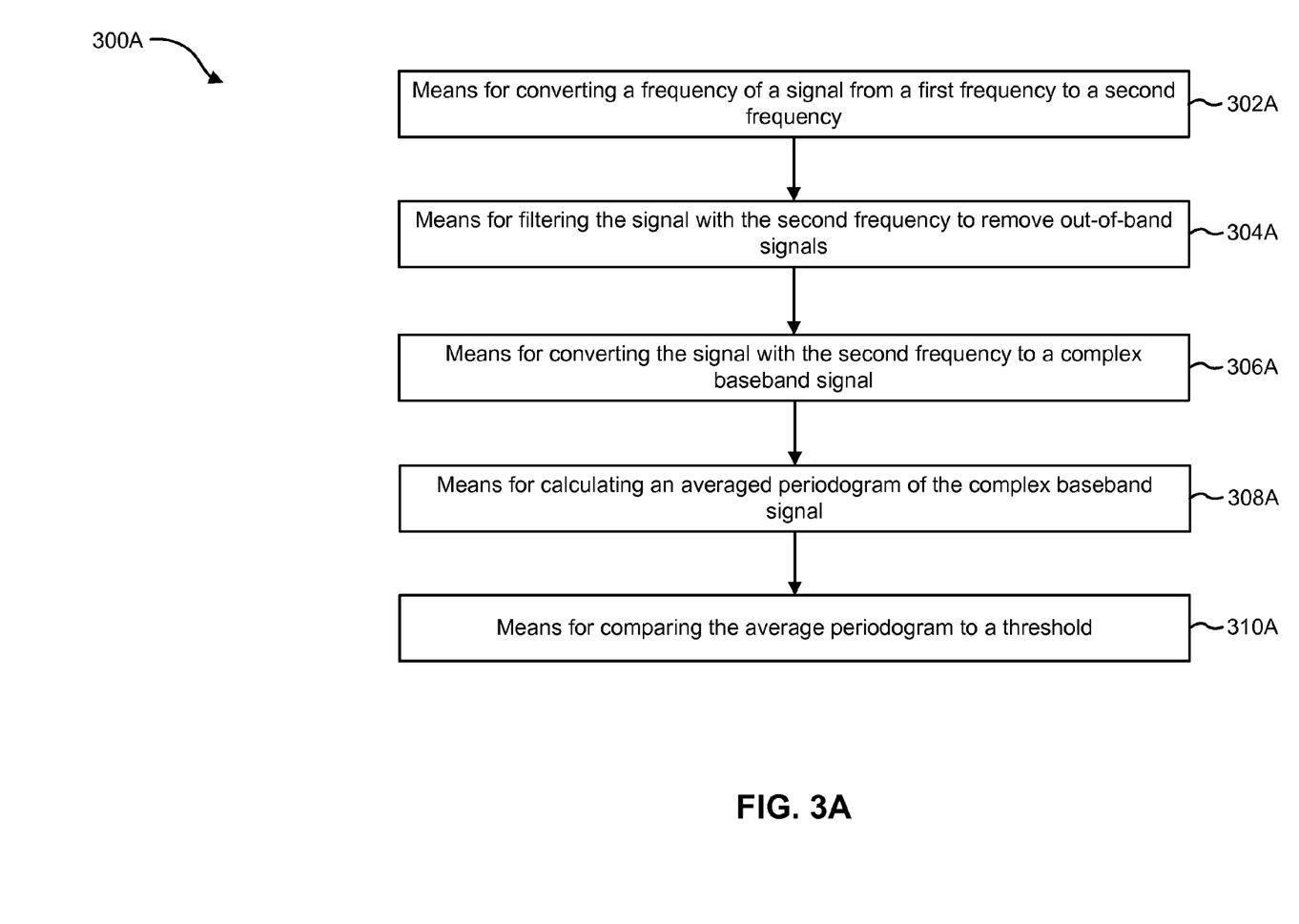
FIG. 3A illustrates means plus function blocks corresponding to the method shown in FIG. 3.

The method of FIG. 3 described above may be performed by various hardware and/or software component(s) and/or module(s) corresponding to the means-plus-function blocks illustrated in FIG. 3A. In other words, blocks 302A through 310A illustrated in FIG. 3A correspond to means-plus-function blocks 302 through 310 illustrated in FIG. 3.

Figure 4:
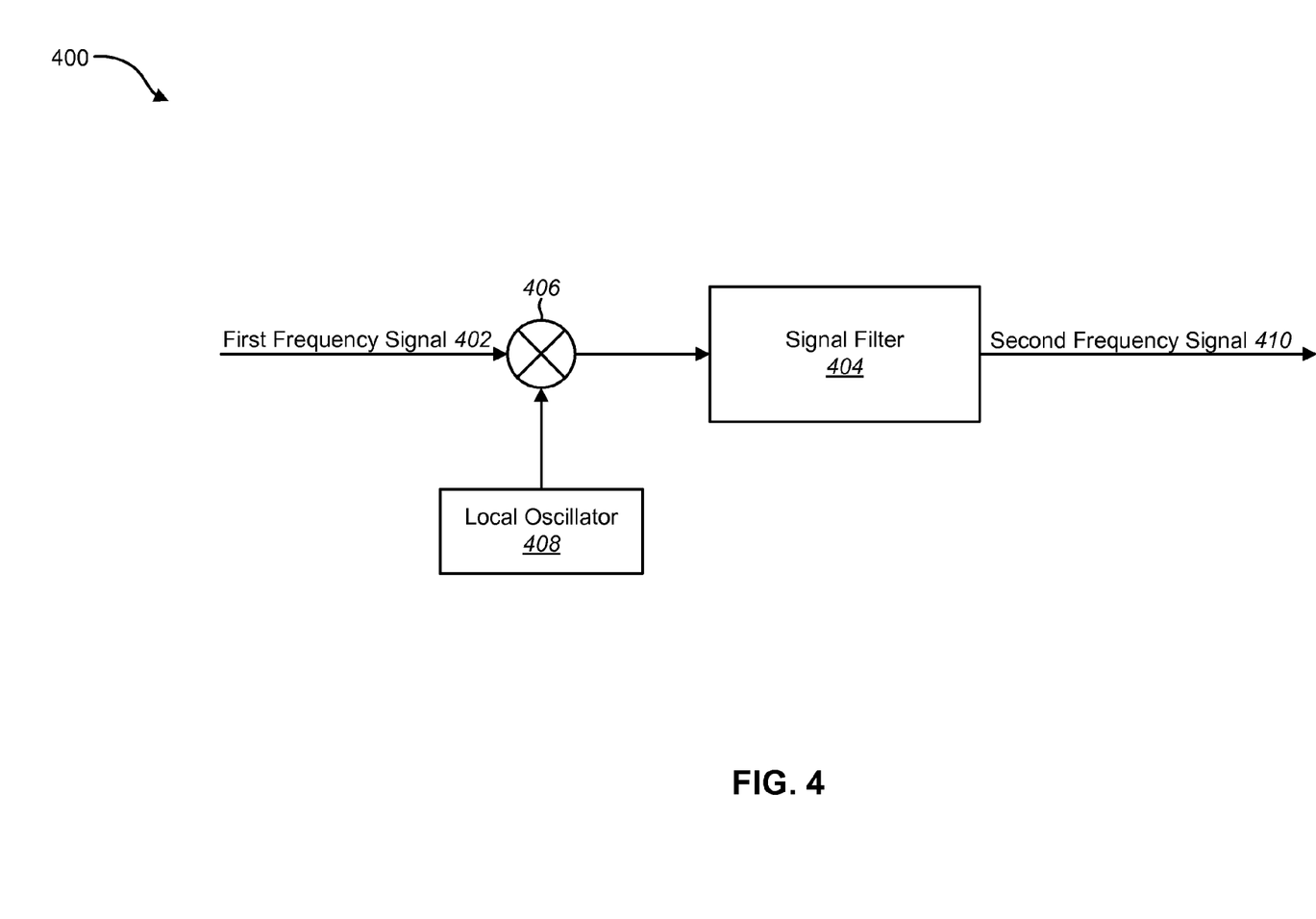
FIG. 4 is one example of a process illustrating the conversion of a first frequency signal to a second frequency signal.

FIG. 4 is one example of a process 400 illustrating the conversion of a first frequency signal 402 to a second frequency signal 410. The first frequency signal 402 may be an RF signal and is provided to a mixer 406 (such as an RF mixer). The first frequency signal 402 may be mixed with a sinusoidal signal provided by a local oscillator 408. The sinusoidal signal may be $\cos(2\pi f_{LO1} t)$, where the frequency, $f_{LO1}$, of the local oscillator 408 is the difference between the first frequency and the second frequency (i.e., the RF and the IF). An unfiltered second frequency signal may be filtered by a signal filter 404 to produce the second frequency signal 410. The signal filter 404 may be a 6 MHz IF bandpass filter that filters out any out-of-band signals.

Figure 5:
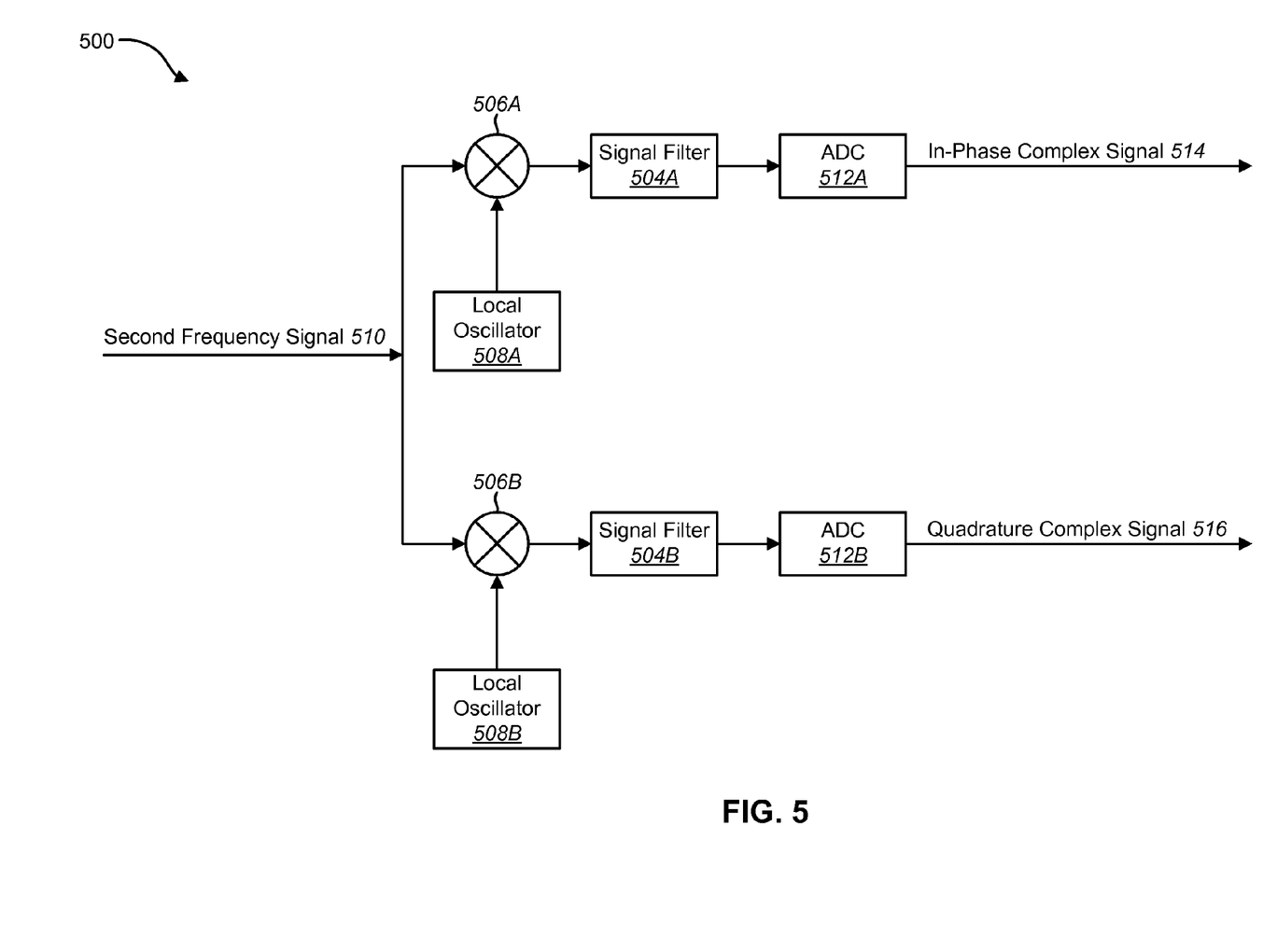
FIG. 5 is one example of a process illustrating the conversion of the second frequency signal to a complex baseband signal.

FIG. 5 is one example of a process 500 illustrating the conversion of the second frequency signal 510 to a complex baseband signal 514, 516. The process 500 may implement low speech analog to digital conversion (ADC) and analog filtering. The second frequency signal 510 may be sent to a first mixer 506A to be mixed with a sinusoidal signal from a first local oscillator 508A. The sinusoidal signal from the first local oscillator may be $\cos(2\pi f_{LO2} t)$. The second frequency signal 510 may also be sent to a second mixer 506B to be mixed with a sinusoidal signal from a second local oscillator 508B. The sinusoidal signal from the second local oscillator 508B may be $\sin(2\pi f_{LO2} t)$.

The following provides one example of a process to determine the frequency, $f_{LO2}$. In one example, the frequency midway between the two possible ATSC pilot frequencies (illustrated in Table 1 above) is converted to the frequency of a direct current (DC) signal. A DC signal is at the frequency f=0. The frequency midway between the two ATSC pilot frequencies is provided by the following:

$$309440.6 + \frac{328843.6 - 309440.6}{2} = 319142.1 \text{ Hz} \qquad \text{Equation 6}$$

An IF frequency of $f_{IF}$ may be specified. One example of the IF frequency may be 5.38 MHz, however, another IF frequency may be specified. As previously stated above, the ATSC pilot is referenced from the lower band edge of the 6 MHz TV channel. Based on the frequency midway calculated from Equation 6 and the IF frequency, $f_{IF}$, the frequency of the local oscillator 508A, 508B for conversion from an IF signal to a complex baseband signal is the following:

$$f_{LO2} = (f_{IF} - 3 \times 10^6) + 319142.1 \text{ Hz} \qquad \text{Equation 7}$$

The unfiltered mixed signal is filtered by a signal analog filter 504A, 504B with a low pass filter with a bandwidth sufficiently wide to capture the ATSC pilot signal. The bandwidth of the low pass analog filter may be referred to as "BW" below. In one example, the actual BW is selected to be wider than the pilot frequency uncertainty described above in Equation 5. The filtered complex signal may be sampled with an analog to digital converter (ADC) 512A, 512B at a sample rate of at least BW Hz. In some examples, the sample rate is larger than BW. An in-phase component of the complex signal 514 and a quadrature component of the complex signal 516 may be the output of the process 500.

Figure 6:
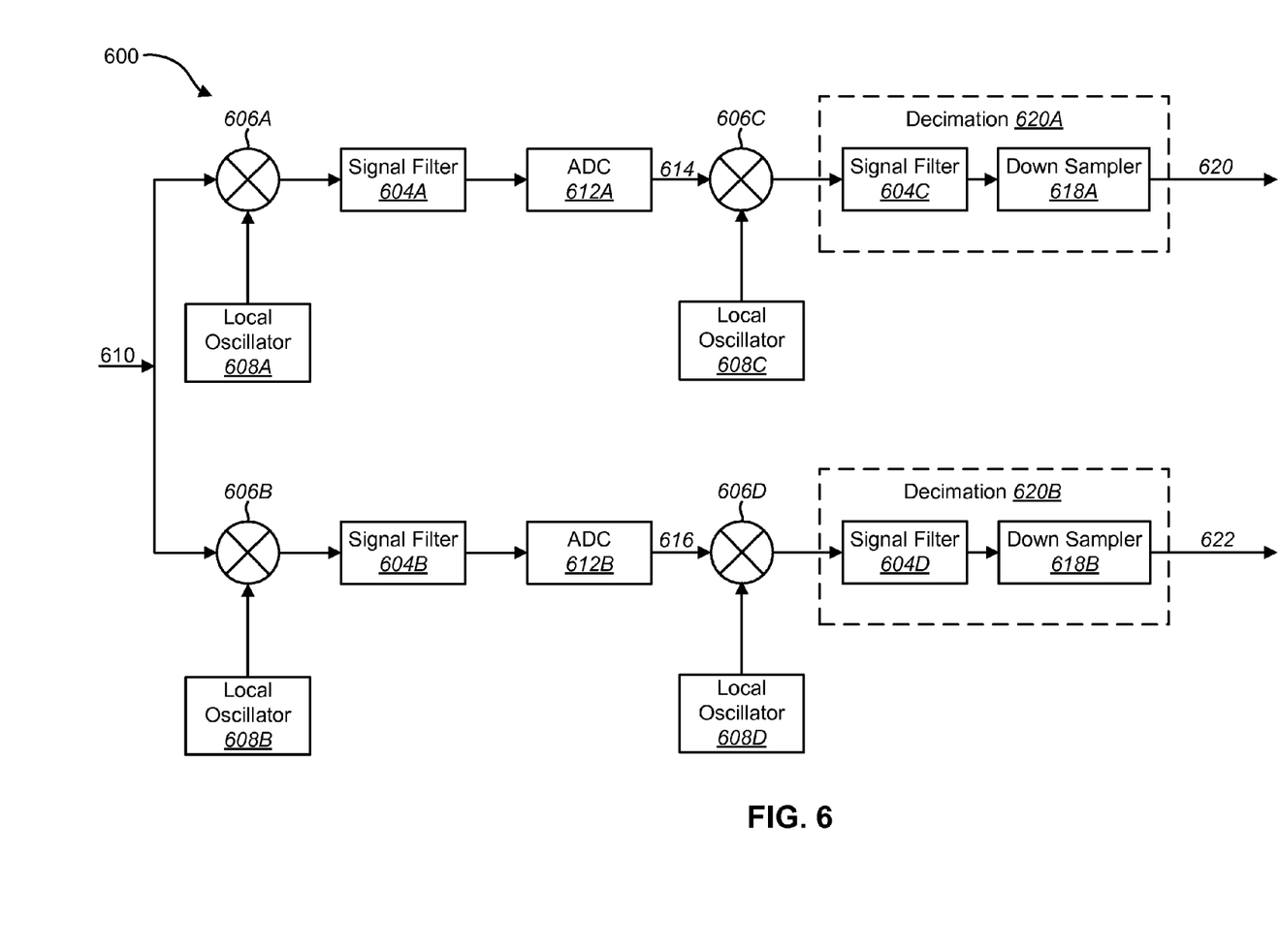
FIG. 6 is another example of a process illustrating the conversion of the second frequency signal to a complex baseband signal.

FIG. 6 is another example of a process 600 illustrating the conversion of the second frequency signal 610 to a complex baseband signal 620, 622. In contrast to the process 500 described in FIG. 5, the process 600 illustrated in FIG. 6 may implement high speed ADC and digital filtering. The process 600 may be used when the high speed analog to digital conversion is implemented for sensing other primary signals because the same circuitry may be used for sensing licensed transmissions (e.g., ATSC transmissions).

The second frequency signal 610 may be provided to a first mixer 606A to be mixed with a sinusoidal signal from a first oscillator 608A. The sinusoidal signal from the first local oscillator 608A may include $\cos(2\pi f_{LO3} t)$. The second frequency signal 610 may also be sent to a second mixer 606B to be mixed with a sinusoidal signal from a second local oscillator 608B. The sinusoidal signal from the second local oscillator 608B may be $\sin(2\pi f_{LO3} t)$. The second frequency signal 610 may be converted to a complex analog baseband signal, with the 6 MHz ATSC signal centered on DC. Hence, the frequency, $f_{LO3}$, of the first and second local oscillator 608A, 608B may be the IF frequency, as provided by the following:

$$f_{LO3} = f_{IF} \qquad \text{Equation 8}$$

The mixed, unfiltered signal may be sent to a signal analog filter 604A, 604B to be filtered with a low pass filter and sampled by an ADC 612A, 612B, at a sampling rate, $f_s$, of at least 6 MHz. The complex signal 614, 616 may be digitally frequency translated to bring the frequency midway between the possible ATSC pilot frequencies to DC.

An in-phase component of the complex signal 614 is sent to a first mixer 606C to be mixed with a sinusoidal signal from a third local oscillator 608C. The sinusoidal signal from the third local oscillator 608C may be $\cos(2\pi f_{LO4} t)$. A quadrature component of the complex signal 616 is sent to a second mixer 606D to be mixed with a sinusoidal signal from a fourth local oscillator 608D. The sinusoidal signal from the third local oscillator 608C may be $\sin(2\pi f_{LO4} t)$. The frequency, $f_{LO4}$, of the third local oscillator 608C and the fourth local oscillator 608D for the digitally frequency translation that translates the frequency midway between the possible ATSC pilot frequencies may be given by the following:

$$f_{LO4} = -3 \times 10^6 + 319142.1 \text{ Hz} \qquad \text{Equation 9}$$

Since this frequency translation is performed in the digital domain, the analog frequency, $f_{LO4}$, is translated into the digital domain by dividing $f_{LO4}$ by the sampling rate $f_s$.

The analog-filtered signal is sent to a first decimation 620A phase and a second decimation phase 620B. The decimation phases 620A, 620B include a digital signal filter 604C, 604D that filters the analog-filtered signal with a low pass filter whose bandwidth is equivalent to the BW. The bandwidth of a digital signal filter may be referred to as DBW. The BW may be large enough to capture the ATSC pilot even with the pilot frequency uncertainty provided in Equation 5. The DBW of the digital signal filters 604C, 604D may be the BW, divided by the sampling rate $f_s$.

The digitally-filtered signal may be sent to a down sampler 618A, 618B which down samples the signal at the following rate:

$$M = \left\lfloor \frac{f_S}{BW} \right\rfloor \qquad \text{Equation 10}$$

In some examples, the sampling rate is 6 MHz and the digital filter 604C, 604D, DBW is approximately 25 KHz. Therefore, the down sampling rate, M, is approximately a factor of 240. As previously stated, the low pass filtering with a digital filter 604C, 604D, and the down sampling of the signal may be referred to as decimation. Outputs 620, 622 of the first and second decimation phases 620A, 620B may be a digital complex baseband signal 620, 622.

Figure 7:
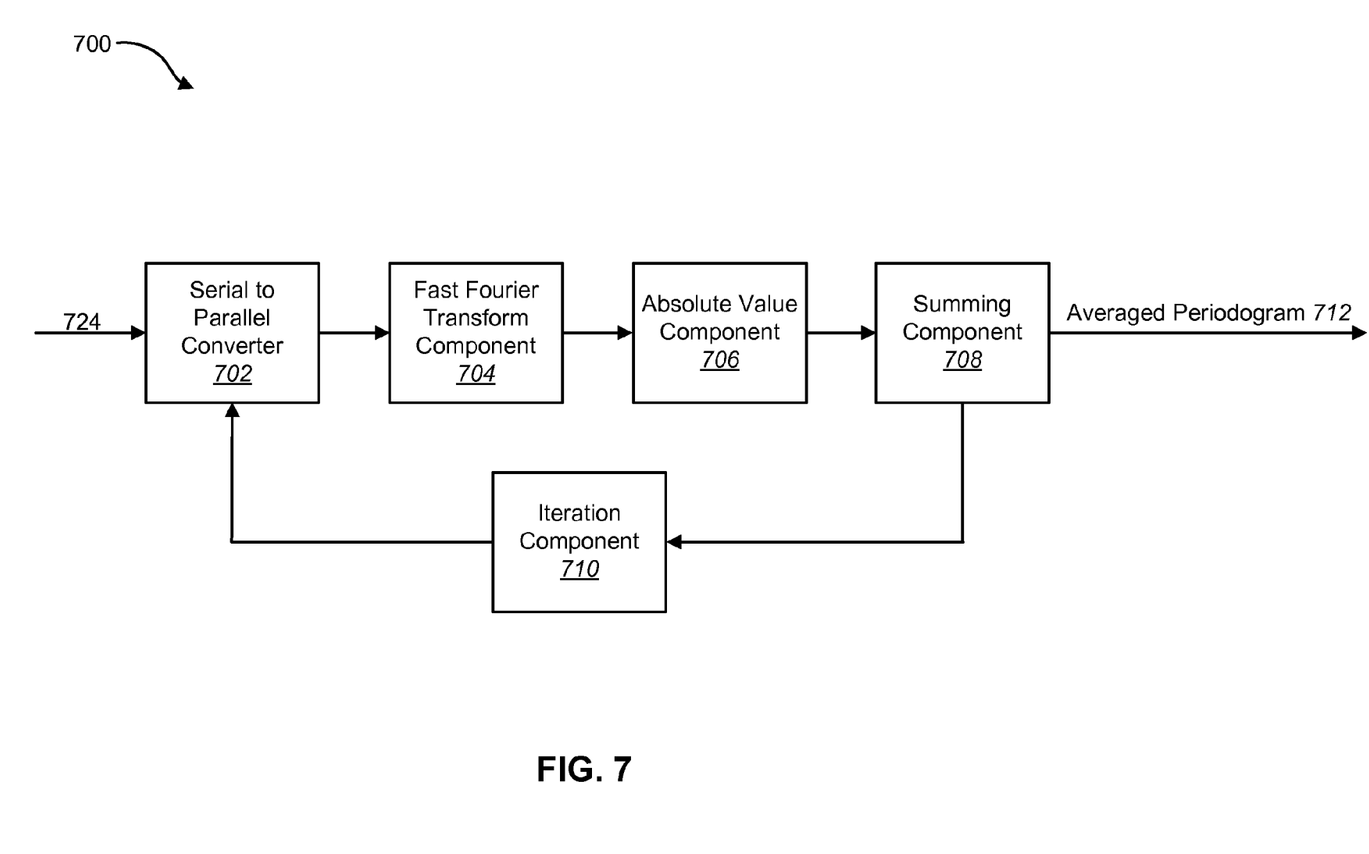
FIG. 7 is a process illustrating one example of calculating an averaged periodogram.

FIG. 7 is a process 700 illustrating one example of calculating an averaged periodogram 712. A digital complex baseband signal 724 may be provided to a serial to parallel converter 702. In one example, a periodogram of the digital complex baseband signal 724 is given by the following:

$$P(\omega) = \frac{1}{N} \left| \sum_{m=0}^{N-1} x(m) \exp(-j\omega m) \right|^2 \qquad \text{Equation 11}$$

The argument of the summation may be a Discrete Fourier Transform (DFT), which may be implemented by a Fast Fourier Transform Component 704 that utilizes a Fast Fourier Transform (FFT). An absolute value component 706 provides the absolute value of the FFT and each output of the FFT is squared. A summing component sums together samples taken from the signal 724. An iteration component 710 obtains additional samples from the signal 724 until a predefined number of samples are acquired. For example, the baseband signal 724 is observed for multiple time segments. In each time segment, N samples are obtained. In one example, M time segments are used. These M time segments need not be adjacent in time. For example, these time segments, M, may occur periodically.

In some examples, network transmission is ceased during the sensing time in order to best observe the spectrum during the sensing time. The sensing time with ceased network transmission may be referred to as a "quiet time" below. Since the sensing intervals do not need to be contiguous in time, it is possible to space them out so that the total quiet time is subdivided into a series of shorter quiet times. Since network transmission is ceased during the quiet time, it may be advantageous to minimize the duration of each sensing interval. This may result in a smaller impact on network latency. For example, if the network is using a regular frame structure, then the sensing time may be subdivided into M sensing intervals. Each sensing interval may be the length of a single frame and each sensing interval may be separated by multiple frames. In one example, the impact of the quiet time on the network latency is during a single frame.

A periodogram may be calculated for each sensing interval. Thus, according to the above example, there are M periodograms, one from each sensing interval. The present systems and methods may use an averaged periodogram 712. The averaged periodogram 712 may be the summation of each of the individual periodograms from each sensing interval, divided by the number of sensing intervals. The summation may be executed by the summing component 708. An example of the averaged periodogram 712 is provided by the following:

$$\overline{P}(\omega) = \frac{1}{M} \sum_{m=1}^{M} P_m(\omega) \qquad \text{Equation 12}$$

In Equation 12, $P_m(\omega)$ may be the periodogram from the M-th sensing interval at an angular frequency $\omega$. If M is fixed, there is no need to divide by M. A threshold to which the averaged periodogram 712 is compared may be scaled by M. Eliminating the division by M simplifies the complexity of the present systems and methods.

After computing a periodogram for each sensing interval, the largest value of the averaged periodogram 712 may be selected as a test statistic. The test statistic may be provided as follows:

$$T = \max_{\omega} [\overline{P}(\omega)] \qquad \text{Equation 13}$$

A decision as to whether an ATSC signal is present in a TV channel is determined by whether the test statistic from Equation 13 exceeds a predefined threshold. This decision may be represented as the following:

$$T \overset{D_1}{\underset{D_0}{\gtreqless}} c_1 \qquad \text{Equation 14}$$

If the test statistic, T, exceeds the threshold, $c_1$, the decision $D_1$ may be selected which signifies that an ATSC signal is present in the TV channel. If, on the other hand, the test statistic does not exceed the threshold, the decision $D_0$ may be selected which signifies that an ATSC signal is not present in the TV channel.

In another example, a final check may be made to ensure that the test statistic does not exceed the threshold due to interference from another wireless system. In addition to comparing the test statistic, T, to a predefined threshold, $c_1$, a second threshold may be computed that is a function of data.

If the test statistic does not exceed the second threshold, a decision may be made as to whether the decision using the threshold, $c_1$, was due to a false detection.

In one example, the N values of the averaged periodogram 712 may be labeled as a vector P, whose entries are provided as follows:

$$P(n) = \overline{P}(n\omega_0) \qquad \text{Equation 15}$$
$$\left(\frac{N}{2} - 1\right) \leq n \leq \frac{N}{2}$$

In order to select a second threshold that is dependent on the data, one or more of the N values may be zeroed-out near the frequency of the maximum value of the N values. The index of the vector P that provides the maximum value of the N values may be m. This index may also be the test statistic such that:

$$P(m) = \max_n [P(n)] = T \qquad \text{Equation 16}$$

In one example, values of P near the index m may be zeroed out. A new vector may be given by the following:

$$\tilde{P}(n) = \begin{cases} 0 & |n - m| \leq k \\ P(n) & \text{otherwise} \end{cases} \qquad \text{Equation 17}$$

In other words, 2k+1 values of the periodogram, centered where the maximum value of the periodogram is located, are zeroed out. The second threshold that is dependent on the data may be a scaled version of the maximum value of the periodogram values that were not zeroed out. The second threshold may be provided as the following:

$$c_2 = \alpha \times \max_n [\tilde{P}(n)] \alpha > 1 \qquad \text{Equation 18}$$

In one example, the value of $\alpha$ is chosen in order to make adjustments between the false alarm rate and the probability of detection. Implementing these two thresholds, a decision that an ATSC signal is present in a TV channel occurs when the test statistic exceeds the maximum of the two thresholds, $c_1$ and $c_2$.

Figure 8:
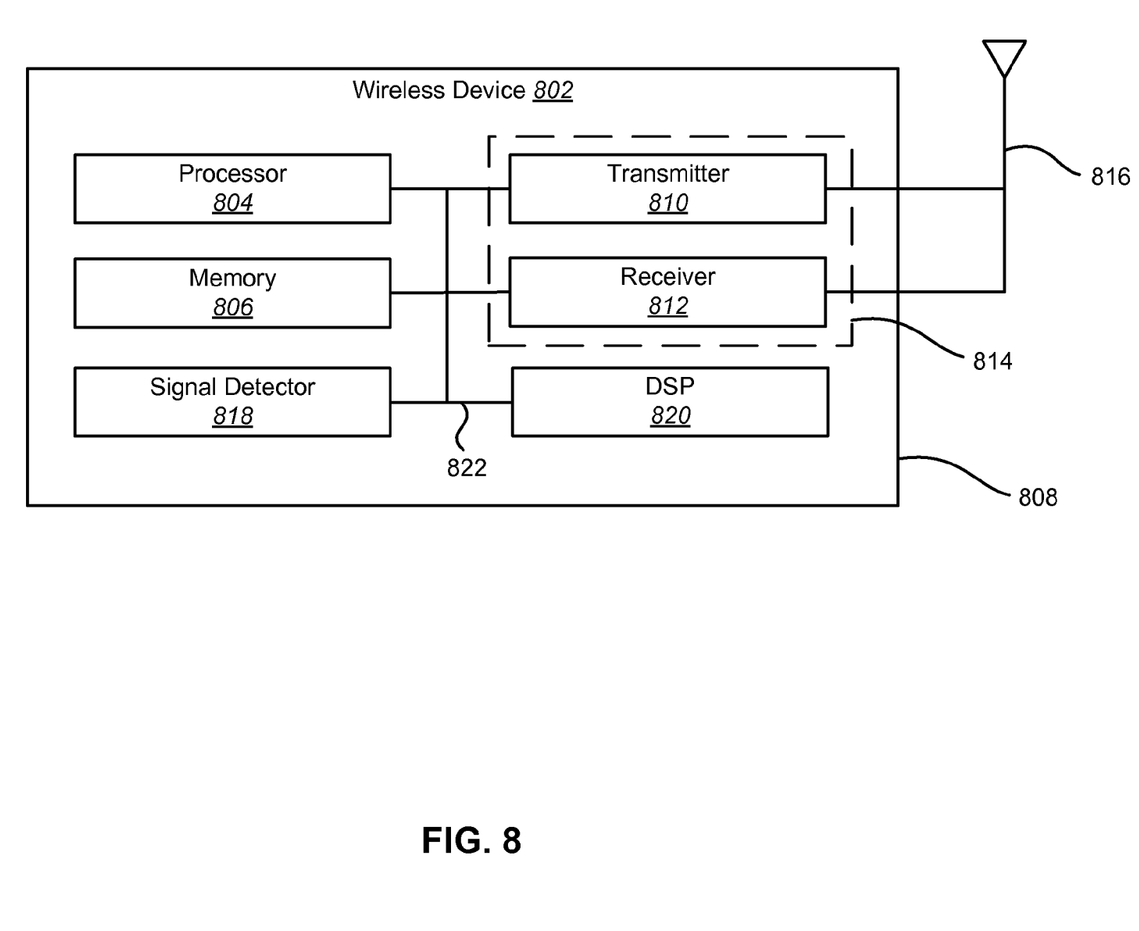
FIG. 8 illustrates various components that may be utilized in a wireless device.

FIG. 8 illustrates various components that may be utilized in a wireless device 802. The wireless device 802 is an example of a device that may be configured to implement the various methods described herein. The wireless device 802 may be a base station 110, 112, 114, 116, 118 or a user device 108A-108K.

The wireless device 802 may include a processor 804 which controls operation of the wireless device 802. The processor 804 may also be referred to as a central processing unit (CPU). Memory 806, which may include both read-only memory (ROM) and random access memory (RAM), provides instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable to implement the methods described herein.

The wireless device 802 may also include a housing 808 that may include a transmitter 810 and a receiver 812 to allow transmission and reception of data between the wireless device 802 and a remote location. The transmitter 810 and receiver 812 may be combined into a transceiver 814. An antenna 816 may be attached to the housing 808 and electrically coupled to the transceiver 814. The wireless device 802 may also include (not shown) multiple transmitters, multiple receivers, multiple transceivers and/or multiple antenna.

The wireless device 802 may also include a signal detector 818 that may be used to detect and quantify the level of signals received by the transceiver 814. The signal detector 818 may detect such signals as total energy, pilot energy per pseudonoise (PN) chips, power spectral density, and other signals. The wireless device 802 may also include a digital signal processor (DSP) 820 for use in processing signals.

The various components of the wireless device 802 may be coupled together by a bus system 822 which may include a power bus, a control signal bus, and a status signal bus in addition to a data bus. However, for the sake of clarity, the various busses are illustrated in FIG. 8 as the bus system 822.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for detecting the presence of a transmission signal in a wireless spectrum channel, comprising:
    converting, by a wireless device, the frequency of a signal from a first frequency to a second frequency;
    filtering, by the wireless device, the signal with the second frequency to remove signals that are not within the band of the second frequency;
    selecting, by the wireless device, a local oscillator frequency based in part on a frequency that is midway between two possible pilot frequencies;
    using, by the wireless device, the selected local oscillator frequency to convert the signal with the second frequency to a complex baseband signal;
    calculating, by the wireless device, an averaged periodogram of the complex baseband signal;
    comparing, by the wireless device, a value of the averaged periodogram to a threshold; and
    detecting, by the wireless device, the presence of the transmission signal, if the value of the averaged periodogram exceeds the threshold.

2. The method of claim 1, further comprising determining a highest value of the averaged periodogram.

3. The method of claim 2, further comprising comparing the highest value of the averaged periodogram to the threshold.

4. The method of claim 1, wherein the frequency of the signal is a radio frequency.

5. The method of claim 1, wherein the complex baseband signal is a digital complex baseband signal.

6. The method of claim 5, further comprising estimating a power spectrum of the digital complex baseband signal using the averaged periodogram.

7. The method of claim 1, further comprising comparing the value of the averaged periodogram to a data dependent threshold.

8. The method of claim 7, further comprising detecting the presence of the transmission signal, if the value of the averaged periodogram exceeds the threshold and the data dependent threshold.

9. The method of claim 1, wherein the wireless spectrum channel is a television (TV) channel.

10. The method of claim 1, wherein detecting the presence of the transmission signal is implemented by a cognitive radio device.

11. The method of claim 1, wherein the transmission signal is an Advanced Television Systems Committee (ATSC) signal.

12. A wireless device for detecting the presence of a transmission signal in a wireless spectrum channel, comprising:
    a processor;
    memory in electronic communication with the processor; and
    instructions stored in the memory, the instructions being executable to:
        convert the frequency of a signal from a first frequency to a second frequency;
        filter the signal with the second frequency to remove signals that are not within the band of the second frequency;
        select a local oscillator frequency based in part on a frequency that is midway between two possible pilot frequencies;
        use the selected local oscillator frequency to convert the signal with the second frequency to a complex baseband signal;
        calculate an averaged periodogram of the complex baseband signal;
        compare a value of the averaged periodogram to a threshold; and
        detect the presence of the transmission signal, if the value of the averaged periodogram exceeds the threshold.

13. The wireless device of claim 12, wherein the wireless device is a handset.

14. The wireless device of claim 12, wherein the wireless device is a base station.

15. The wireless device of claim 12, wherein the instructions are further executable to determine a highest value of the averaged periodogram.

16. The wireless device of claim 15, wherein the instructions are further executable to compare the highest value of the averaged periodogram to the threshold.

17. The wireless device of claim 12, wherein the frequency of the signal is a radio frequency.

18. The wireless device of claim 12, wherein the complex baseband signal is a digital complex baseband signal.

19. The wireless device of claim 18, wherein the instructions are further executable to estimate a power spectrum of the digital complex baseband signal using the averaged periodogram.

20. The wireless device of claim 12, wherein the transmission signal is an Advanced Television Systems Committee (ATSC) signal.

21. An apparatus that is configured to detect the presence of a transmission signal in a wireless spectrum channel, comprising:
- means for converting the frequency of a signal from a first frequency to a second frequency;
- means for filtering the signal with the second frequency to remove signals that are not within the band of the second frequency;
- means for selecting a local oscillator frequency based in part on a frequency that is midway between two possible pilot frequencies;
- means for using the selected local oscillator frequency to convert the signal with the second frequency to a complex baseband signal;
- means for calculating an averaged periodogram of the complex baseband signal;
- means for comparing a value of the averaged periodogram to a threshold; and
- means for detecting the presence of the transmission signal, if the value of the averaged periodogram exceeds the threshold.

22. A computer-program product for detecting the presence of a transmission signal in a wireless spectrum channel, the computer-program product comprising a non-transitory computer-readable medium having instructions thereon, the instructions comprising:
- code for causing a wireless device to convert the frequency of a signal from a first frequency to a second frequency;
- code for causing the wireless device to filter the signal with the second frequency to remove signals that are not within the band of the second frequency;
- code for causing the wireless device to select a local oscillator frequency based in part on a frequency that is midway between two possible pilot frequencies;
- code for causing the wireless device to use the selected local oscillator frequency to convert the signal with the second frequency to a complex baseband signal;
- code for causing the wireless device to calculate an averaged periodogram of the complex baseband signal;
- code for causing the wireless device to compare a value of the averaged periodogram to a threshold; and
- code for causing the wireless device to detect the presence of the transmission signal, if the value of the averaged periodogram exceeds the threshold.

* * * * *